United States Patent [19]

Watanabe

[11] Patent Number: 4,695,243

[45] Date of Patent: Sep. 22, 1987

[54] DEVICE FOR MOULDING CONTAINERS

[76] Inventor: Makoto Watanabe, 2-13-3 Tomihama, Ichihara-Shi, Chiba-Ken, Japan

[21] Appl. No.: 916,207

[22] Filed: Oct. 7, 1986

Related U.S. Application Data

[62] Division of Ser. No. 813,273, Dec. 24, 1985.

[51] Int. Cl.⁴ .................... B29C 51/06; B29C 51/20
[52] U.S. Cl. .................... 425/388; 264/550;
    264/292; 264/296; 425/291; 425/398; 425/400
[58] Field of Search ............ 425/383, 385, 394, 395,
    425/398, 399, 400, 406, 408, 412, 414, 415, 416,
    419, 291, 422, 457, 343, 518, 519, DIG. 10,
    DIG. 47; 264/320, 322, 550, 323, 292, 296, 48.6,
    49.6; 249/176

[56] References Cited

U.S. PATENT DOCUMENTS 4,563,325 1/1986 Coffman .................... 264/322

FOREIGN PATENT DOCUMENTS 8078 5/1939 Japan .
49-51571 5/1974 Japan .

Primary Examiner—Jay H. Woo
Attorney, Agent, or Firm—Wenderoth, Lind & Ponack

[57] ABSTRACT

There have been provided synthetic resin food containers and the method and device for moulding the containers.

The container has a bottom wall, a side wall extending at an obtuse angle to the bottom wall and a rim or legs extending from the undersurface of the bottom wall.

The device comprises a male mould including a main body, a bottom forming portion received in the main body for vertical movement relative to the main body and a pressurizing portion disposed for vertical movement relative to the bottom forming portion; and a female mould for receiving a portion of the bottom forming portion.

The method comprises the steps of forcing said portion of the bottom forming portion into the female mould to form the bottom of the container, raising the bottom forming portion and substantially simultaneously move the pressurizing portion to form the rim or legs on the bottom of the container.

2 Claims, 8 Drawing Figures

DEVICE FOR MOULDING CONTAINERS

This application is a divisional of application Ser. No. 813,273 filed Dec. 24, 1985 pending.

BACKGROUND OF THE INVENTION

This invention relates to a synthetic resin container having the rim or legs which project downwardly from the undersurface of the bottom thereof substantially at right angles to the bottom and have thickness and density greater than the other parts of the container and a method and a device for moulding such a container.

Conventional food containers formed of synthetic resin and particularly, of foam synthetic resin such as foam polystyrene have the rim or legs which bulge downwardly from the bottom. However, the bottom rim or legs have the same thickness and density as the other parts of the container such as the side and bottom walls, for example (refer to Laid-Open Japanese Utility Model Application Publication No. 51571/1974, for example). The conventional moulding devices and methods for moulding containers by thermal moulding synthetic resin sheet into a container have been impossible to mould the bottom rim or legs having thickness and density greater than those of the other parts of the container.

The disadvantages of the conventional synthetic resin containers for foods are that since the bottom rim or legs of the container have the same thickness and density as those of the other parts of the container, the container is unstable and tends to fall down easily and that since the bottom rim or legs merely bulge from the container bottom, when boiling water or the like is poured into the container all the parts of the container including the bottom rim or legs are soon heated to a substantially elevated temperature and the high temperature of the boiling water or the like is directly transferred to the user's fingers which contact the bottom rim or legs of the container and thus, the user can not grip the container rim or legs easily.

SUMMARY OF THE INVENTION

The present invention is to eliminate the disadvantages inherent in the conventional synthetic resin containers for foods and the conventional moulding devices and methods for moulding such containers. The term "synthetic resin containers" used herein implies containers obtained by thermally moulding foam or non-foam synthetic resin sheet such as food containers, beverage containers, trays, receiving cases and plates on which articles are placed, for example. According to the present invention, in the moulding of a synthetic resin container from synthetic resin sheet, the rim or legs are formed extending downwardly from the undersurface of the bottom of the container substantially at right angles to the bottom of the container and the thus formed rim or legs have thickness and density greater than those of the other parts of the container and thus, the container has an improved stability and will not fall down easily. Furthermore, even when boiling water is poured into the food container, since the thick bottom rim or legs exhibit heat insulation function, the user who places his fingers on the rim or legs will not feel hot.

The moulding device and method of the present invention is applicable to thermal moulding of foam or non-foam synthetic resin sheet, that is, vacuum moulding and/or compressed air moulding.

In the moulding of a container from foam or nonfoam synthetic resin sheet according to the moulding method of the present invention, first of all, the bottom forming portion of the male mould is placed into the mating recess in the female mould under pressure to form the rim or legs on the undersurface of the bottom of a container being moulded, the male mould is pulled up out of the recess in the female mould to leave a cavity or cavities in the rim or legs and the pressurizing portion of the male mould is then pressed against the bottom of the container to force a portion of the molten resin into the cavity or cavities in the rim or legs to thereby form a container having the bottom rim or legs having thickness and density greater than those of the other parts of the container.

The above and other objects and attendant advantages of the present invention will be more readily apparent to those skilled in the art from a reading of the following detailed description in conjunction with the accompanying drawings which show preferred embodiments of the invention for illustration purpose only, but not for limiting the scope of the same in any way.

PREFERRED EMBODIMENTS OF THE INVENTION

Figure 1:
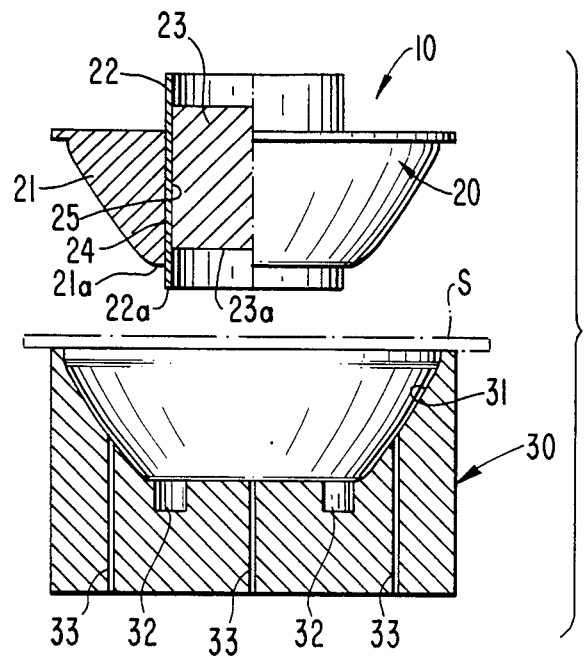
FIG. 1 is an elevational view in partial section of the male and female moulds of one embodiment of the container moulding device constructed in accordance with the present invention.
Figure 2:
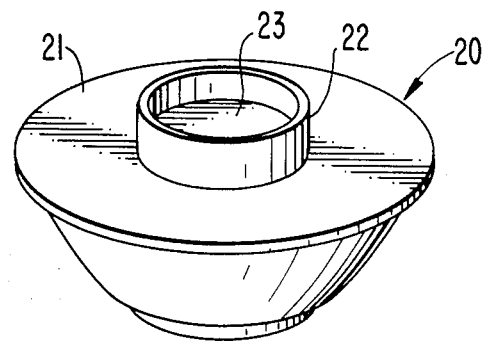
FIG. 2 is a perspective top plan view of the male mould of the container moulding device shown in FIG. 1.

The present invention will be now described referring to the accompanying drawings and more particularly, to FIGS. 1 to 5 inclusive in which the first embodiment of the container moulding device of the invention is shown. The embodiment of the moulding device is designed to mould a food container having an elliptical cross-section as seen in horizon together with the rim on the bottom of the container by vacuum moulding.

The moulding device is generally shown by 10 and generally comprises a male mould 20 and a female mould 30.

The male mould 20 comprises a main body 21 having an optionally selected shape, a bottom forming portion 22 having an elliptical cross-section as seen in horizon and a pressurizing portion 23. The bottom forming portion 22 is received within a vertical through opening 24 formed in the main body 21 for vertical movement therein and the pressurizing portion 23 is received within an opening 25 defined by the bottom forming portion 22 for vertical movement therein. As more clearly shown in FIG. 1, the bottom forming portion 22 and the pressurizing portion 23 are normally so positioned that the lower edge 22a of the bottom forming portion 22 projects downwardly beyond the lower edge 21a of the main body 21 by a small distance and the lower edge 23a of the pressurizing portion 23 is positioned within the bottom forming portion 22 above the plane of the lower edge 21a of the main body 21 by a small distance, respectively.

The female mould 30 is substantially conventional except that the bottom of a cavity 31 defined by the female mould is formed with an annular recess 32, having an elliptical cross-section as seen in horizon, mating the bottom forming portion 22 of the male mould 20. A plurality of vacuum passages 33 extend vertically through the female mould 30 and communicate at the upper ends with the cavity 31 and at the lower ends with an external vacuum source (not shown).

The radius of curvature and position of the bottom forming portion 22 and of the recess 32 are suitably selected depending upon the radius of curvature and position of the rim on the bottom of a particular container to be moulded.

Figure 3:
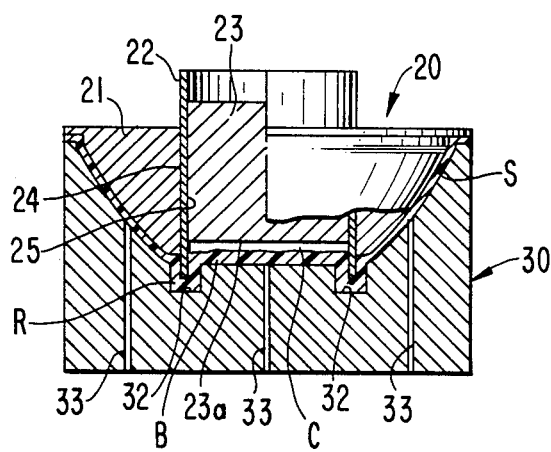
FIGS. 3 and 4 are elevational views in partial section showing different stages in the moulding operation on the container moulding device according to the present invention.

In order to mould a container with the rim on the bottom thereof by the employment of the male mould 20 and female mould 30 of the moulding device 10 according to the present invention, first of all, a sheet of synthetic resin S is clamped to the top of the female mould 30 in the conventional manner, softened by heating and sucked into the cavity 31 in the female mould 30 by vacuum suction provided from the external vacuum source through the vacuum passages 33 into the cavity 31 in the female mould 30. With the resin sheet S sucked in the female mould 30, the main body 21 and bottom forming portion 22 of the male mould 20 are placed into the female mould 30 under pressure leaving the pressurizing portion 23 behind as shown in FIG. 3, whereupon the resin sheet S is moulded into an intermediate container product having the side wall W and the opening defined by the side wall W. In the moulding of the intermediate container as mentioned hereinabove, since the lower edge 22a of the bottom forming portion 22 which normally projects beyond the lower edge 21a of the male mould main body 21 is pressed in the annular recess 32, a portion of the softened synthetic resin sheet S is caused to abut against the bottom of the recess 32 in the female mould 30 to thereby form the rim R on the bottom of the container. However, since the lower edge 23a of the pressurizing portion 23 of the male mould is positioned above the lower edge 21a of the male mould main body 21 by a small distance as mentioned hereinabove and thus, a clearance C is maintained between the lower edge 23a of the pressurizing portion 23 and the inner surface of the bottom of the container, the portion of the bottom of the container surrounded by the thus formed rim R on the bottom of the container remains unpressed.

Figure 4:
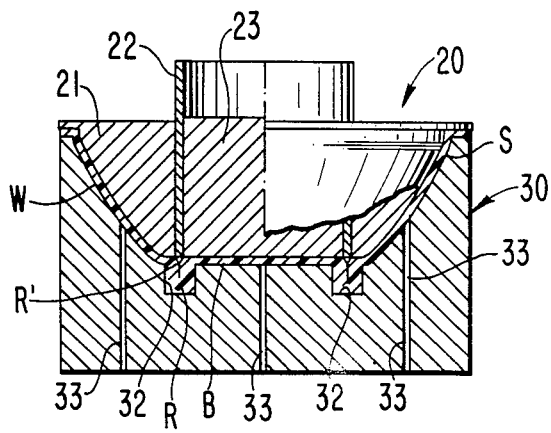
Figure 5:
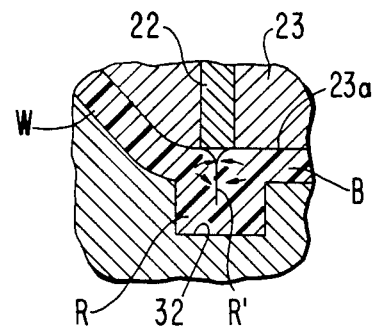
FIG. 5 is a vertically sectional view on an enlarged scale showing the forming of the rim on the bottom of a container being moulded according to the method of the present invention.

Next, when the bottom forming portion 22 is pulled up and substantially at the same time, the pressurizing portion 23 is pushed down as shown in FIG. 4, the softened resin sheet of the container bottom portion B is subjected to pressure by the pressurizing portion 23 to become the finished or complete container bottom and the softened resin sheet is forced to enter the cavity R' left in the bottom rim R as a result of the male mould bottom forming portion 22 being pulled up and fills up the cavity R' as the resin sheet sets in the cavity R'. The complete container is removed from the moulding device by cooling the container in the conventional manner until the same cools to a desired hardness.

Figure 6:
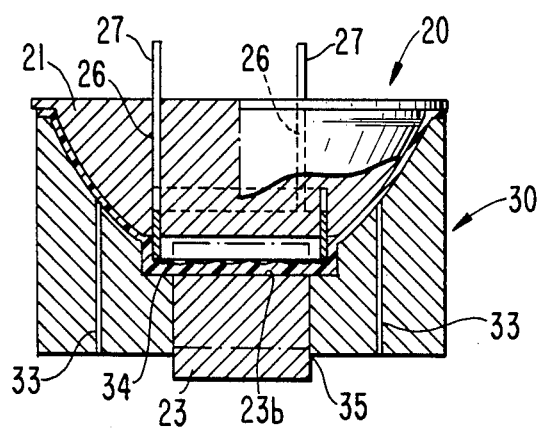
FIG. 6 is an elevational view in partial section of another embodiment of the moulding device according to the present invention.

Turning now to FIG. 6 which shows another embodiment of the container moulding device according to the present invention. In the second embodiment, the corresponding parts are shown by the same numerals as those used in the first embodiment and the main body 21 of the male mould 20 is formed with a plurality of vertical guide holes 26 there through. The bottom forming portion 22 of the male mould is suspended by a plurality of suspension bars 27 each received in the corresponding guide hole 26 to be guided therealong so that the bottom forming portion 22 is movable vertically relative to the main body 21 of the male mould 20. The female mould 30 is concaved inwardly of the annular recess 32 as shown by 34 and the concaved portion 34 is formed with a vertical opening 35 extending through the female mold for receiving the male mould pressurizing portion 23 which is positioned below the bottom forming portion 22 in the embodiment of FIG. 6 instead of being positioned within the bottom forming portion 22 as in the first embodiment. The upper surface 23b of the pressurizing portion 23 normally lies in the plane of the upper surface of the concaved portion 34.

In the mouldihg of a synthetic resin container by the use of the embodiment of FIG. 6, the male mould 20 is placed into the concaved portion 34 of the female mould 30 under pressure in the same manner as in the first embodiment to pressurize the heated molten synthetic resin sheet clamped to the top of the female mould 30. The bottom forming portion 22 and pressurizing portion 23 are then substantially simultaneously raised whereby the portion of the molten resin sheet S forming the bottom B of the container is moulded into the bottom B with the rim R of the container and a portion of the bottom forming resin is forced into the cavity left in the rim as a result of the raising of the male mould bottom forming portion 22.

In the two embodiments of the container moulding device according to the invention described hereinabove, the endless rim of the bottom of a container is formed by the elliptical cross-section bottom forming portion 22 of the male mould 20 and the mating recess 32 in the female mould 30, but when the bottom forming portion 22 and the mating recess 32 are formed as having a discontinuous contour, the bottom of the moulded container may be provided with legs in desired positions of the undersurface of the bottom.

Figure 7A:
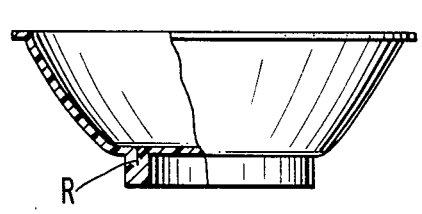
FIG. 7A is an elevational view in partial section of a bowl-shaped food container embodying the present invention.
Figure 7B:
FIG. 7B is an elevational view in partial section of a dish-shaped food container embodying the present invention.

FIG. 7A shows a container with the bottom rim produced by the present invention and FIG. 7B shows a different container with the legs L produced by the present invention.

While the present invention has been particularly shown and described with reference to the preferred embodiments thereof, it will be understood by those skilled in the art that various changes in form and details may be made therein without departing from the spirit and scope of the invention.

What is claimed is:

1. A device for moulding a synthetic resin container for foods, comprising a male mould including a main body of a selected shape having a lower edge, a bottom forming portion received in said main body for vertical movement therein and having a lower edge, said bottom forming portion being normally so held in the main body that the lower edge of the bottom forming portion projects downwardly beyond the lower edge of the main body by a small distance, a pressurizing portion received in said bottom forming portion for vertical movement therein and having a lower edge, said pressurizing portion being normally so held in the bottom forming portion that the lower edge of the pressurizing portion is positioned above the lower edge of said main body by a small distance; and a female mould having a mating recess for receiving said lower edge of the bottom forming portion in the male mould.

2. A device for moulding a synthetic resin container for foods, comprising a male mould including a main body of a selected shape having a lower edge, a bottom forming portion received in said main body for vertical movement therein and having a lower edge, said bottom forming portion being normally so held in the main body that the lower edge of the bottom forming portion projects downwardly beyond the lower edge of said main body by a small distance, and a pressurizing portion positioned outside of said main body for vertical movement below said bottom forming portion and having an upper edge; and a female mould having a mating recess for receiving said lower edge of the bottom forming portion and a recessed portion formed inwardly of said recess and including an opening for receiving said pressurizing portion for vertical movement therein, said pressurizing portion being normally so held that the upper edge of the pressurizing portion lies in the plane of the upper surface of said recessed portion.

* * * * *